US011336775B2

(12) United States Patent
Iwao

(10) Patent No.: US 11,336,775 B2
(45) Date of Patent: May 17, 2022

(54) NON-TRANSITORY COMPUTER READABLE MEDIUM AND CONTENT INFORMATION DISTRIBUTION SERVER WITH USAGE OF LOCATION INFORMATION OF MOBILE DEVICE

(71) Applicant: FUJIFILM Business Innovation Corp., Tokyo (JP)

(72) Inventor: Kazumasa Iwao, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 248 days.

(21) Appl. No.: 16/516,253

(22) Filed: Jul. 18, 2019

(65) Prior Publication Data

US 2020/0036841 A1 Jan. 30, 2020

(30) Foreign Application Priority Data

Jul. 26, 2018 (JP) .............................. JP2018-140542

(51) Int. Cl.
*H04N 1/00* (2006.01)
*H04W 4/80* (2018.01)
*H04W 4/029* (2018.01)

(52) U.S. Cl.
CPC ........ *H04N 1/00106* (2013.01); *H04W 4/029* (2018.02); *H04W 4/80* (2018.02)

(58) Field of Classification Search
CPC ..... H04N 1/00106; H04W 4/029; H04W 4/80

USPC ........................................................ 358/1.15
See application file for complete search history.

(56) References Cited

U.S. PATENT DOCUMENTS

| 8,274,677 | B2 * | 9/2012 | Asano ...................... H04L 67/36 |
| | | | 358/1.9 |
| 9,639,899 | B1 * | 5/2017 | Gersitz .................... H04W 4/02 |
| 10,070,004 | B2 * | 9/2018 | Suzuki ............... H04N 1/32662 |
| 2013/0057906 | A1 * | 3/2013 | Hosoda ............. H04N 1/32106 |
| | | | 358/1.15 |
| 2018/0176732 | A1 * | 6/2018 | Mikuriya ........... H04N 1/00307 |
| 2018/0367701 | A1 * | 12/2018 | Saito .................... H04N 1/4413 |

FOREIGN PATENT DOCUMENTS

JP 2017-151781 8/2017

* cited by examiner

*Primary Examiner* — Allen H Nguyen
(74) *Attorney, Agent, or Firm* — JCIPRNET

(57) ABSTRACT

A non-transitory computer readable medium stores a program causing a computer to execute a process utilizing location information. The process includes a first control process and a second control process. The first control process includes, in response to receiving of a radio signal used for short-range wireless communication from a transmitter, temporarily activating a location information detector that detects location information, and causing the location information detector to detect the location information. The second control process includes transmitting the location information detected by the location information detector to a server that provides a service utilizing the location information.

14 Claims, 19 Drawing Sheets

FIG. 9

| CONTENT ID | CONTENT INFORMATION | ATTRIBUTE INFORMATION |
|---|---|---|
| C000001 | | PHOTOGRAPH MOUNTAIN |
| C000002 | | PHOTOGRAPH RAILWAY |
| C000003 | | PHOTOGRAPH FLOWER |
| C000004 | | ILLUSTRATION CARTOON CHARACTER CREATED BY INDIVIDUAL SHARING PERMITTED |
| C000005 | | MAP MOUNTAIN |
| C000006 | | MUSICAL SCORE PIANO |
| C000007 | | PHOTOGRAPH IDOL |

CONTENT INFORMATION DB
71

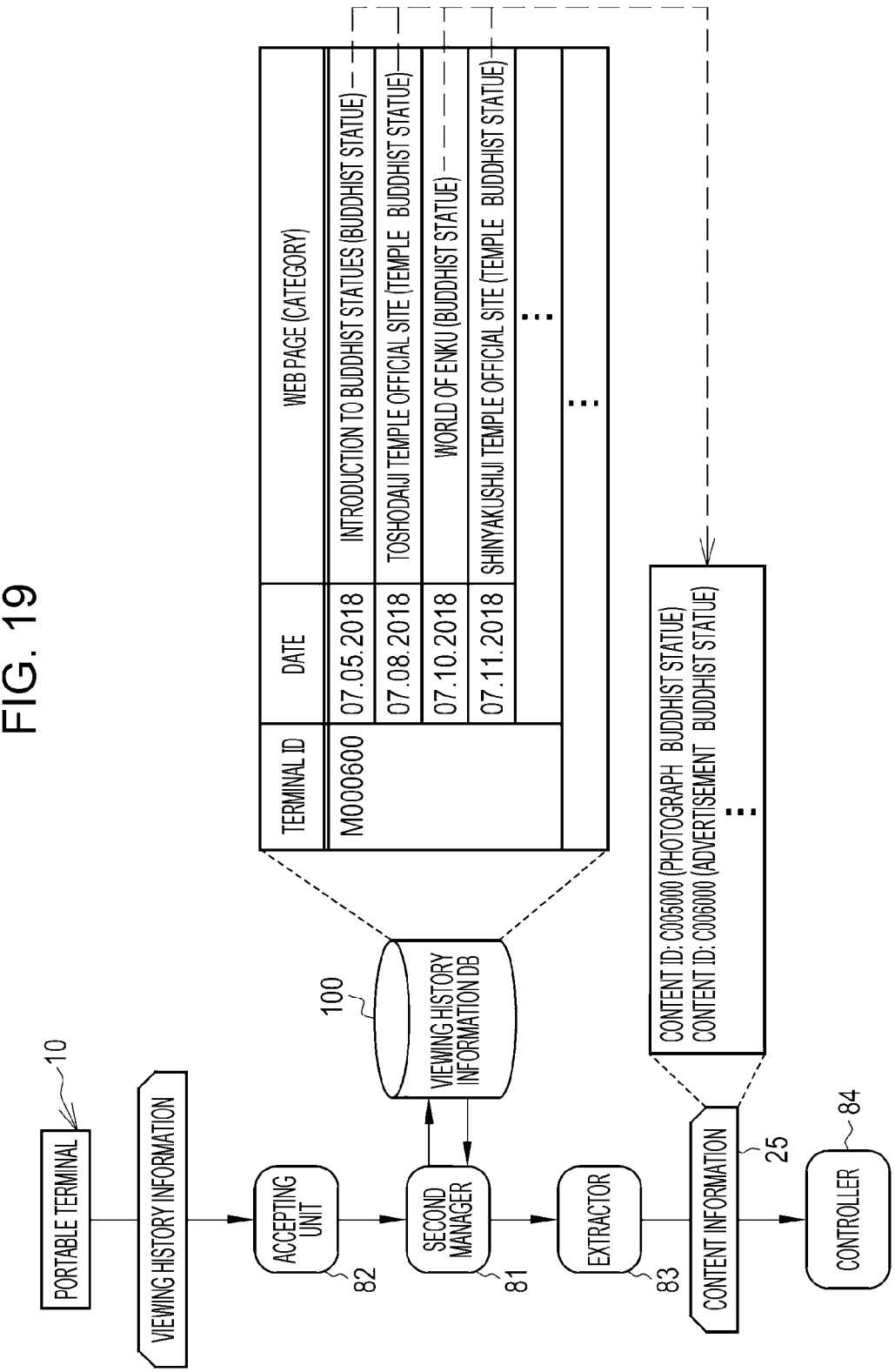

NON-TRANSITORY COMPUTER READABLE MEDIUM AND CONTENT INFORMATION DISTRIBUTION SERVER WITH USAGE OF LOCATION INFORMATION OF MOBILE DEVICE

CROSS-REFERENCE TO RELATED APPLICATIONS

This application is based on and claims priority under 35 USC 119 from Japanese Patent Application No. 2018-140542 filed Jul. 26, 2018.

BACKGROUND

(i) Technical Field

The present disclosure relates to a non-transitory computer readable medium, and a content information distribution server.

(ii) Related Art

Japanese Unexamined Patent Application Publication No. 2017-151781 discloses an advertisement providing system that provides advertisement information to a portable terminal. The advertisement providing system includes a beacon platform that provides advertisement information to the portable terminal based on a beacon signal received by the portable terminal from a device installed in an automatic teller machine (ATM). The beacon platform includes a beacon registry, a campaign registry, and a campaign matching unit. The beacon registry is a registry in which location information on an ATM that receives a beacon signal is registered. The campaign registry is a registry in which, for each piece of advertisement information, information for identifying the advertisement information and information on the distribution conditions for the advertisement information. The campaign matching unit acquires, from a portable terminal that has received a beacon signal, beacon identification information related to a beacon signal and user-related attribute information related to a user via a network, and acquires, from the beacon registry, location information on an ATM corresponding to the acquired beacon identification information. Further, the campaign matching unit acquires, from the campaign registry, advertisement information to be provided to the portable terminal, based on context information including the acquired location information and user-related attribute information.

Portable terminals are provided with a location information detector. Examples of location information detectors include those using global positioning system (GPS) and those using Wi-Fi (registered trademark). Such location information detectors using global positioning system or Wi-Fi, however, suffer from high power consumption. As an alternative to such location information detectors, location information detectors employing short-range wireless communication systems such as Bluetooth (registered trademark) to reduce power consumption have been proposed.

Detection of location information employing short-range wireless communication is performed by a transmitter that transmits a radio signal (called a beacon signal), and a server installed at the data center of an operating company that installs and manages the transmitter. Specifically, the transmitter transmits a radio signal on a regular basis, for example, once per second. Upon receiving a radio signal from the transmitter, the portable terminal transmits a receipt notification signal to the server to notify that the radio signal has been received. The receipt notification signal contains identification information of the transmitter. In the server, information on transmitter installation location is pre-registered for each piece of identification information. The server detects, as location information, information on the installation location of a transmitter corresponding to identification information contained in the receipt notification signal received from the portable terminal.

As described above, use of short-range wireless communication reduces power consumption as compared with use of global positioning system or Wi-Fi. Further, systems employing short-range wireless communication are relatively free from constraints on transmitter installation location. This means that a large number of transmitters can be installed at narrow spacing intervals, allowing for easy detection of more detailed location information.

However, with short-range wireless communication, the timing to detect location information is limited to when the portable terminal receives a radio signal from a transmitter whose installation location is registered in the server. In other words, location information can be detected only within a limited range, that is, within the communication range of transmitters installed by the operating company of the server.

SUMMARY

Aspects of non-limiting embodiments of the present disclosure relate to a non-transitory computer readable medium and a content information distribution server, with which location information may be detected by means of short-range wireless communication without range constraints while achieving reduced power consumption.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a non-transitory computer readable medium storing a program causing a computer to execute a process utilizing location information, the process including a first control process and a second control process. The first control process includes, in response to receiving of a radio signal used for short-range wireless communication from a transmitter, temporarily activating a location information detector that detects location information, and causing the location information detector to detect the location information. The second control process includes transmitting the location information detected by the location information detector to a server that provides a service utilizing the location information.

BRIEF DESCRIPTION OF THE DRAWINGS

Exemplary embodiments of the present disclosure will be described in detail based on the following figures, wherein:

FIG. 9 illustrates the contents of a content information database;

FIG. 19 illustrates how content information is extracted by also referencing viewing history information.

DETAILED DESCRIPTION

First Exemplary Embodiment

Figure 1:
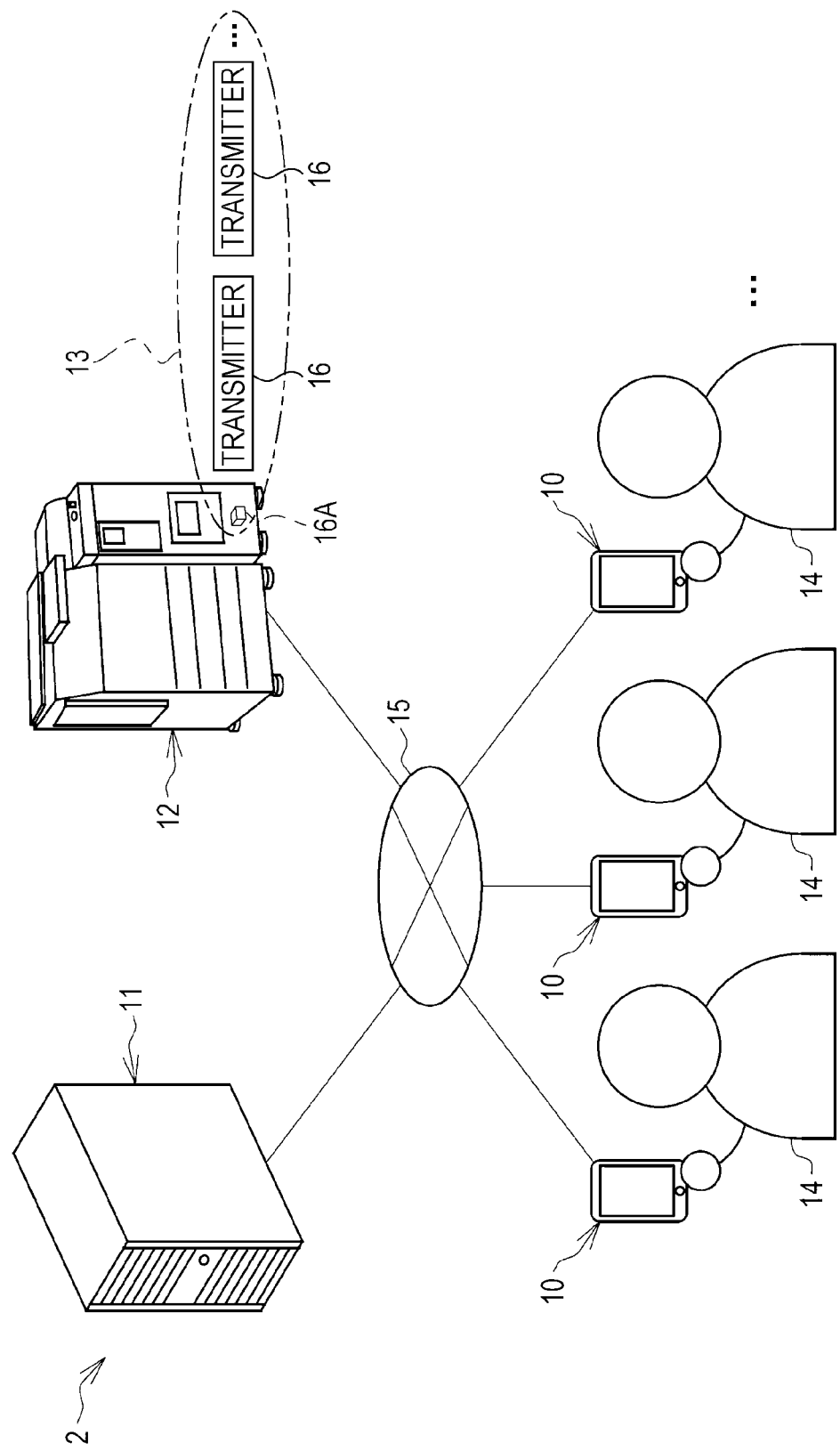
FIG. 1 illustrates a content information distribution system.

Referring to FIG. 1, a content information distribution system 2 includes portable terminals 10, a content information distribution server (to be referred to simply as distribution server hereinafter) 11, a printer 12, and a group of transmitters 13. Each of the portable terminals 10 is a terminal operated by a user 14 of the content information distribution system 2. The portable terminal 10 is implemented as, for example, a tablet personal computer such as a smartphone. The distribution server 11 corresponds to an example of a server that provides a service utilizing location information. The distribution server 11 is implemented as a server computer. The portable terminals 10, the distribution server 11, and the printer 12 are connected in a manner that allows communication therebetween via the Internet or a public network such as a wide area network (WAN) 15.

The portable terminal 10 and the distribution server 11 are each based on a computer such as a tablet personal computer, a server computer, or a workstation. The portable terminal 10 and the distribution server 11 are implemented by installing a control program such as an operating system, various application programs, or other programs on such a computer.

The printer 12 is installed in a store such as a convenience store. The printer 12 is a so-called multifunction machine including not only a print function but also copy, fax, and scanner functions. Although FIG. 1 depicts only one printer 12, in actuality, multiple printers 12 are installed in multiple stores as with the portable terminals 10.

The group of transmitters 13 includes multiple transmitters 16. Each of the transmitters 16 transmits a radio signal used for short-range wireless communication (e.g., communication range: 10 m), such as Bluetooth, on a regular basis, for example, once per second. The radio signal contains transmitter identification data (ID) (see FIG. 2), which represents identification information of the transmitter 16. The transmitter 16 can be installed not only outdoors or indoors but anywhere.

Some transmitters 16 are attached to the printer 12 and some are not. In the following description, the transmitter 16 attached to the printer 12 will be referred to as attached transmitter 16A. Further, some transmitters 16 are installed by the operating company of the distribution server 11 with information about their transmitter IDs and installation locations pre-registered in the distribution server 11, and some are not. In the following description, the transmitter 16 installed by the operating company of the distribution server 11 with information about its transmitter ID and installation location pre-registered in the distribution server 11 will be referred to as registered transmitter 16B (see FIG. 16). In some cases, the attached transmitter 16A may double as the registered transmitter 16B.

The portable terminal 10 has a function to receive a radio signal. The radio-signal receiving function of the portable terminal 10 is set to be activated by the user 14.

Figure 2:
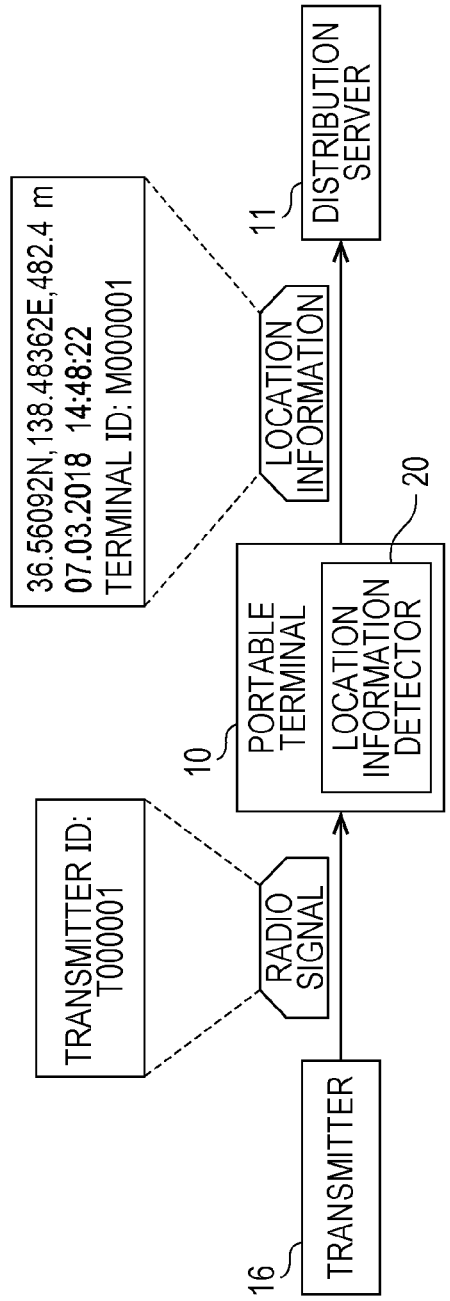
FIG. 2 illustrates how, in response to receiving of a radio signal from a transmitter, location information is transmitted from a portable terminal to a content information distribution server.

Referring to FIG. 2, upon receiving a radio signal from the transmitter 16 (including the registered transmitter 16B), the portable terminal 10 causes location information to be detected by a location information detector 20, which is incorporated in the portable terminal 10. The portable terminal 10 transmits the location information detected by the location information detector 20 to the distribution server 11. The location information detector 20 detects location information by use of either GPS or Wi-Fi. Specific examples of this location information include numerical values representing longitude, latitude, and altitude (36.56092N, 138.48362E, 482.4 m). Further, the location information contains the time of acquisition of the location information (07.03.2018 14:48:22), and terminal ID, which represents the identification information of the portable terminal 10.

Figure 3:
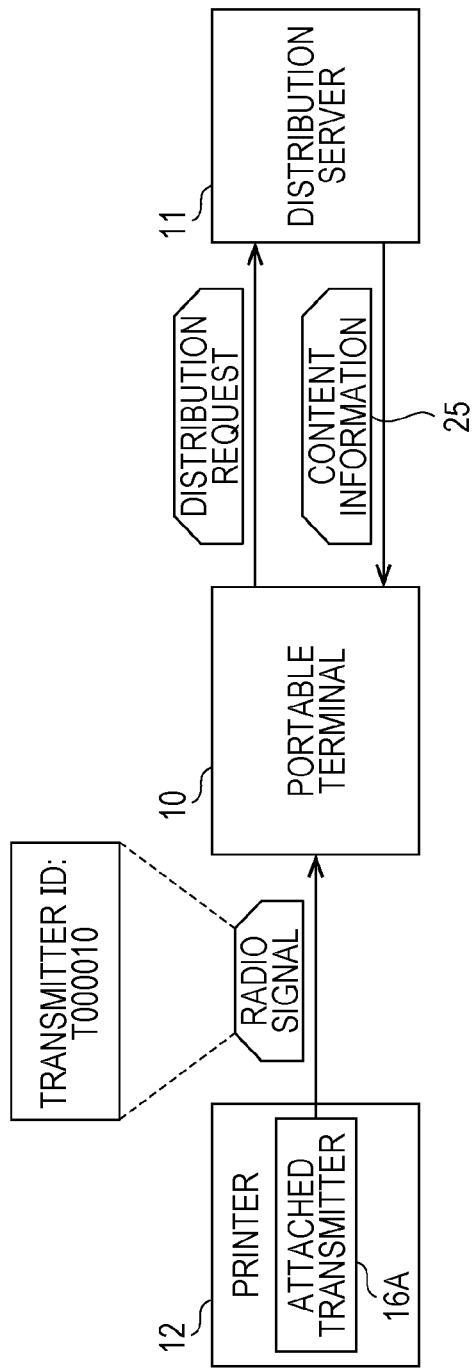
FIG. 3 illustrates how, in response to receiving of a radio signal from an attached transmitter, a distribution request is transmitted from a portable terminal to a content information distribution server, and content information is distributed from the content information distribution server to the portable terminal.

Referring to FIG. 3, when the portable terminal 10 receives a radio signal from the attached transmitter 16A, the portable terminal 10 transmits a distribution request for content information 25 to the distribution server 11. The distribution server 11 accepts the distribution request. The distribution server 11 then distributes, to the portable terminal 10 that is making the distribution request, the content information 25 suited for location information transmitted from the portable terminal 10 making the distribution request. The content information 25 refers to an offered item or article viewable by the user 14. Examples of the content information 25 include text, images, and videos. Although also depending on the radio signal communication range, an exemplary case where the portable terminal 10 receives a radio signal from the attached transmitter 16A is when the user 14 carrying the portable terminal 10 enters a store in which the printer 12 is installed.

Figure 4:
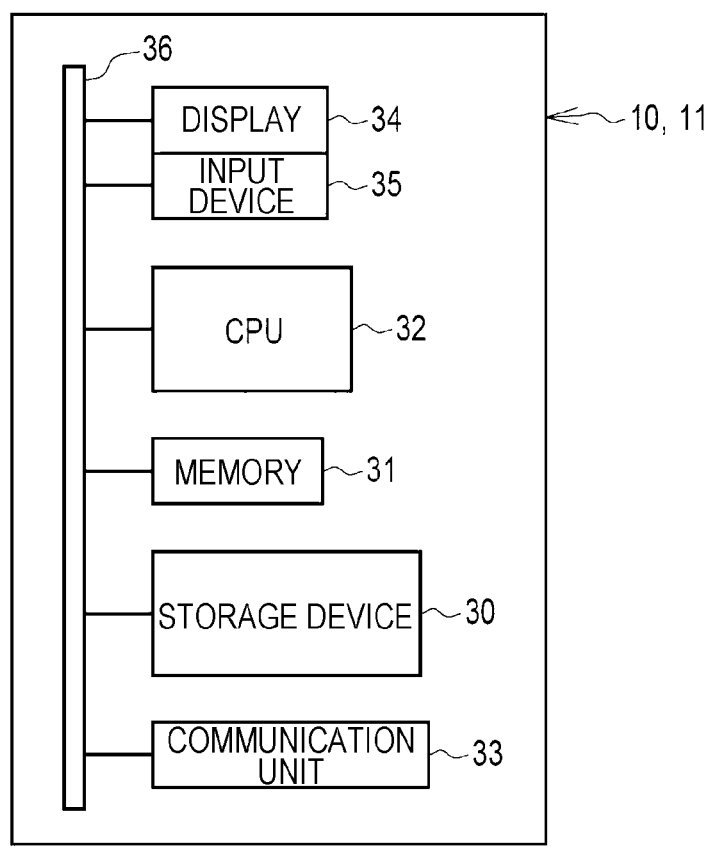
FIG. 4 is a block diagram illustrating a computer constituting each of a portable terminal and a content information distribution server.

Referring to FIG. 4, the portable terminal 10 and the distribution server 11, which are identical in basic configuration, each include a storage device 30, a memory 31, a central processing unit (CPU) 32, a communication unit 33, a display 34, and an input device 35. These components are interconnected via a data bus 36.

The storage device 30 is a hard disk drive that is either incorporated in a computer constituting the portable terminal 10 or other devices, or connected via a cable or a network. Alternatively, the storage device 30 is a disk array of multiple hard disk drives connected together. The storage device 30 stores a control program such as an operating system, various application programs, various data associated with these programs, and other information.

The memory 31 is a working memory for the CPU 32 to execute processing. The CPU 32 loads a program stored in the storage device 30 into the memory 31, and executes processing in accordance with the program to thereby perform centralized control of various units or components of the computer.

The communication unit 33 is a network interface to control transfer of various information via the WAN 15. In the case of the portable terminal 10, the communication unit 33 has a function to receive a radio signal. The display 34 displays various screens. Such various screens are provided with a graphical user interface (GUI)-based operation function. The computer constituting the portable terminal 10 or other devices accepts, via such various screens, input of operational instructions given from the input device 35. The input device 35 is a touchscreen device in the case of the portable terminal 10, and is a keyboard or mouse in the case of the distribution server 11.

In the following description, for differentiation, the suffix "A" is attached to indicate each unit or component of the computer constituting the portable terminal 10, and the suffix "B" is attached to indicate each unit or component of the computer constituting the distribution server 11.

Figure 5:
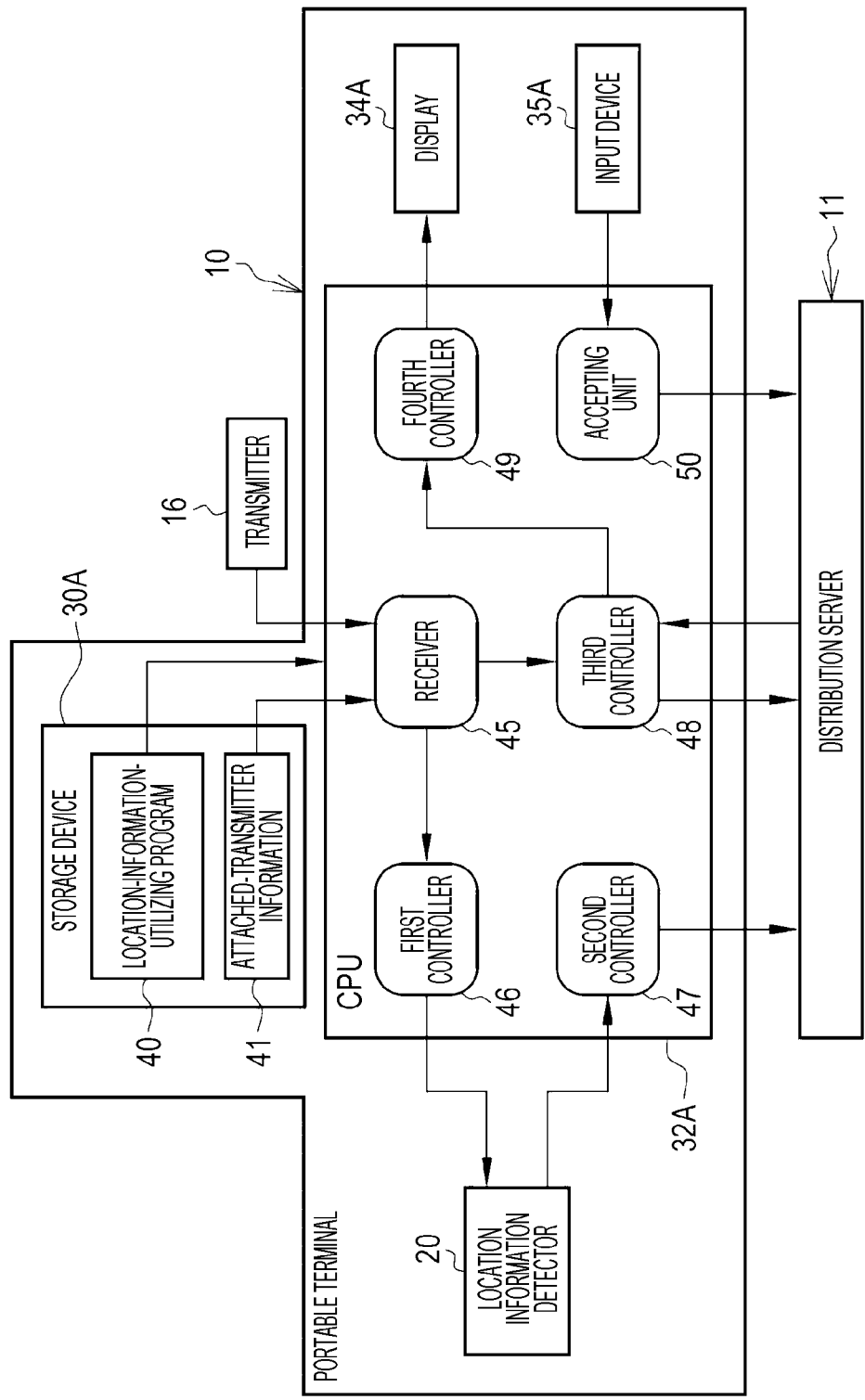
FIG. 5 is a block diagram illustrating processing units in the CPU of a portable terminal.

Referring to FIG. 5, a location-information-utilizing program 40 is stored in the storage device 30A of the portable terminal 10 as an application program. Other than the location-information-utilizing program 40, attached-transmitter information 41 is stored in the storage device 30A.

Upon activation of the location-information-utilizing program 40, the CPU 32A of the portable terminal 10 functions as a receiver 45, a first controller 46, a second controller 47, a third controller 48, a fourth controller 49, and an accepting unit 50, in cooperation with the memory 31 and other components.

The receiver 45 receives a radio signal from the transmitter 16. The receiver 45 outputs a notification signal to one of the first controller 46 and the third controller 48 to notify that the receiver 45 has received a radio signal, based on a transmitter ID contained in the radio signal, and the attached-transmitter information 41 in which the transmitter ID of the attached transmitter 16A is registered.

More specifically, the receiver 45 outputs the notification signal to the first controller 46 if the transmitter ID contained in the received radio signal is not registered in the attached-transmitter information 41, that is, if the transmitter 16 is a transmitter (including the registered transmitter 16B) other than the attached transmitter 16A. By contrast, the receiver 45 outputs the notification signal to the third controller 48 if the transmitter ID contained in the received radio signal is registered in the attached-transmitter information 41, that is, if the transmitter 16 is the attached transmitter 16A.

Although not illustrated in FIG. 5, the receiver 45 outputs the transmitter ID of the attached transmitter 16A to the accepting unit 50.

The first controller 46 temporarily activates the location information detector 20 in response to receiving of a notification signal from the receiver 45, that is, in response to receiving of a radio signal from the transmitter 16 (including the registered transmitter 16B). Then, the first controller 46 causes the location information detector 20 to detect location information. The location information detector 20 outputs the acquired location information to the second controller 47.

The second controller 47 executes a control process that transmits the location information received from the location information detector 20 to the distribution server 11.

The third controller 48 transmits a distribution request for the content information 25 to the distribution server 11 in response to receiving of a notification signal from the receiver 45, that is, in response to receiving of a radio signal from the attached transmitter 16A. The third controller 48 also receives the content information 25 distributed from the distribution server 11 in response to the distribution request. The third controller 48 outputs the received content information 25 to the fourth controller 49.

Figure 7:
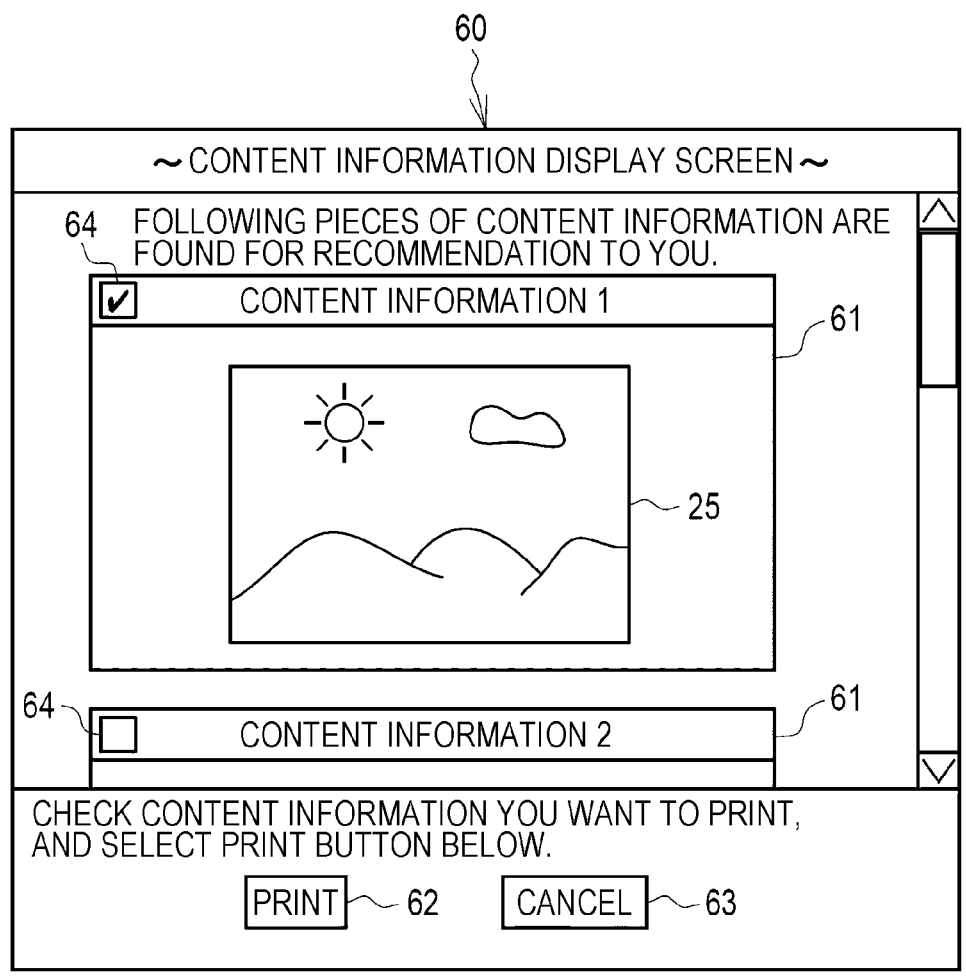
FIG. 7 illustrates a content information display screen.

The fourth controller 49 executes a control process that displays the content information 25 output from the third controller 48 on the display 34A, which corresponds to an example of a display (see FIG. 7).

The accepting unit 50 accepts, from the display 34A on which the content information 25 is being displayed by the fourth controller 49, an instruction (to be referred to as print instruction hereinafter) instructing that the content information 25 be printed by the printer 12. The print instruction is input via the input device 35A. The accepting unit 50 transmits, to the distribution server 11, a print request according to the received print instruction. At this time, the accepting unit 50 inserts, in the print request, the transmitter ID of the attached transmitter 16A output from the receiver 45.

Figure 6:
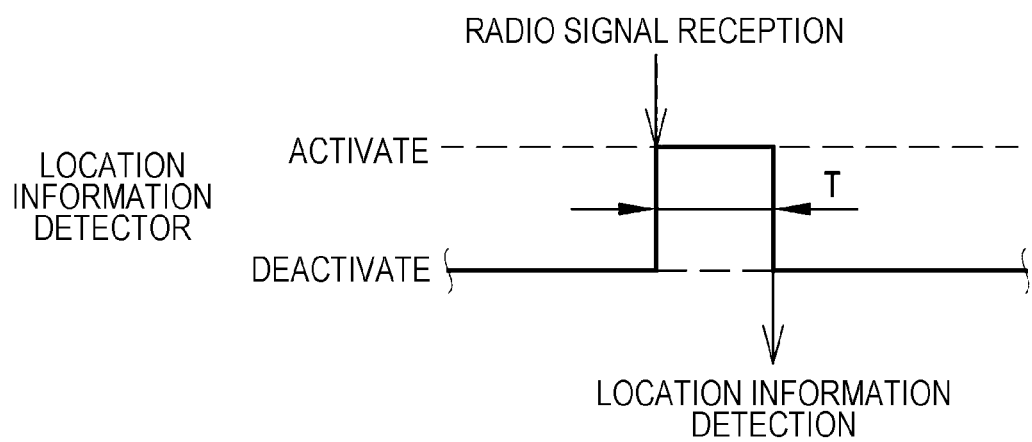
FIG. 6 illustrates the timing of activation of a location information detector controlled by a first controller.

FIG. 6 illustrates the timing of activation of the location information detector 20 controlled by the first controller 46. The location information detector 20 is activated from an inactive state in response to receiving of a radio signal from the transmitter 16. The location information detector 20 is deactivated again by the first controller 46 after detection of location information. That is, the location information detector 20 is temporarily activated by the first controller 46 to detect location information. The amount of time T for which the location information detector 20 is activated is, for example, about 10 seconds.

FIG. 7 illustrates a content information display screen 60 displayed on the display 34A by the fourth controller 49. The content information display screen 60 is provided with a content information display area 61, a Print button 62, and a Cancel button 63. If multiple pieces of content information 25 are distributed from the distribution server 11, multiple content information display areas 61 are provided for individual pieces of content information 25. In the content information display area 61, the content information 25 is displayed at the center, and a checkbox 64 is provided at the upper left edge. The checkbox 64 corresponds to a GUI used to provide a print instruction. When the Print button 62 is selected with a check mark placed in the checkbox 64, it is regarded that an instruction to print the checked content information 25 has been given. A print request is thus transmitted from the accepting unit 50 to the distribution server 11. Selecting the Cancel button 63 hides the content information display screen 60.

Figure 8:
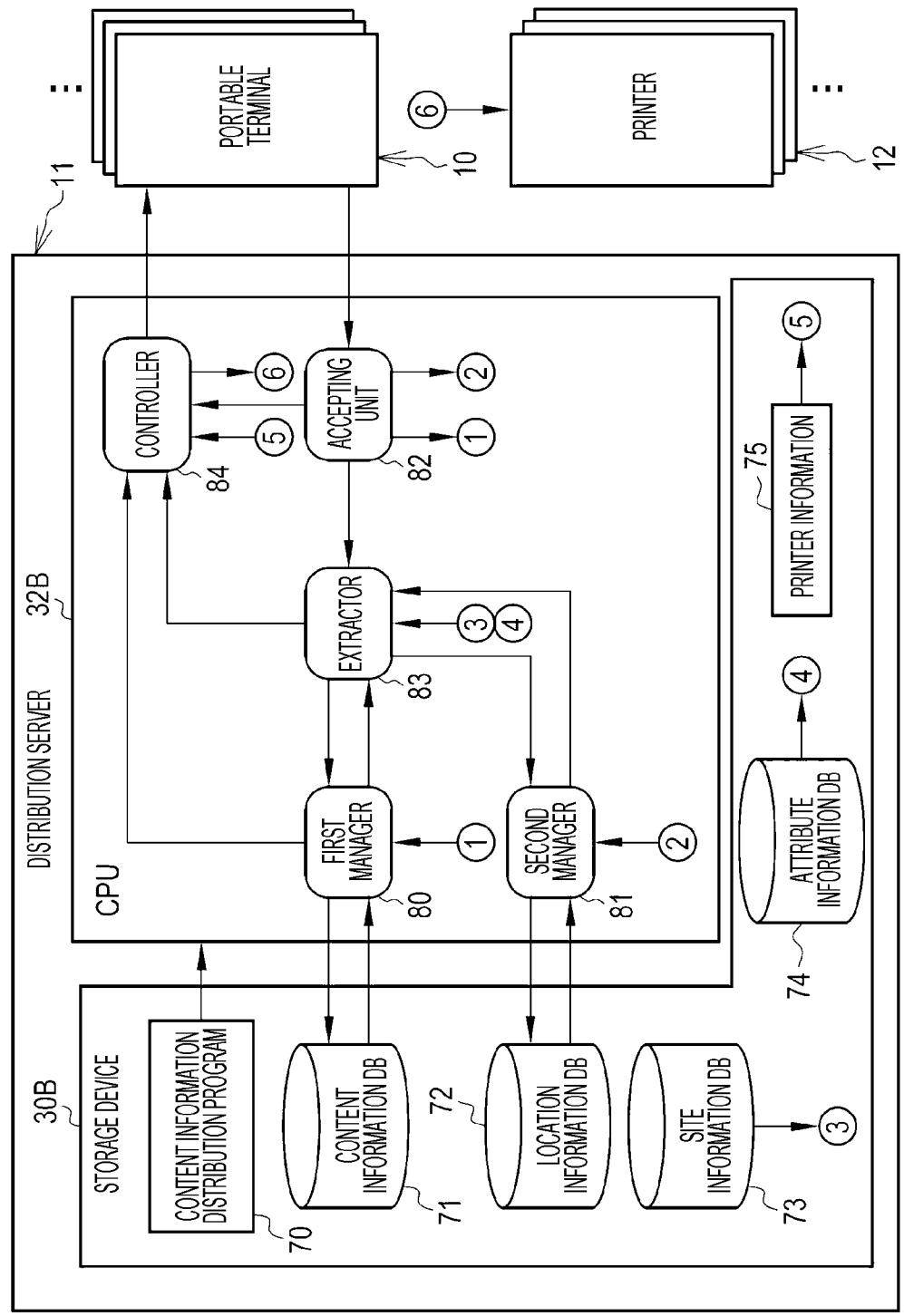
FIG. 8 is a block diagram illustrating processing units in the CPU of a content information distribution server.

Referring to FIG. 8, in the storage device 30B of the distribution server 11, a content information distribution program 70 is stored as an application program. The content information distribution program 70 is an application program for causing a computer to function as the distribution server 11. The storage device 30B stores, in addition to the content information distribution program 70, a content information database (to be abbreviated as DB hereinafter) 71, a location information DB 72, a site information DB 73, an attribute information DB 74, and printer information 75.

Upon activation of the content information distribution program 70, the CPU 32B of the distribution server 11 functions as a first manager 80, a second manager 81, an accepting unit 82, an extractor 83, and a controller 84, in cooperation with the memory 31 and other components.

The first manager 80 manages the content information 25 in association with the attribute information of the content information 25. More specifically, for each content ID representing the identification information of the content information 25, the first manager 80 registers the following pieces of information as a pair into the content information DB 71: the content information 25 output from the accepting unit 82; and the attribute information of the content information 25 (see FIG. 9). Further, the first manager 80 reads a pair of the content information 25 and its attribute information from the content information DB 71, and outputs the read information to the extractor 83.

The second manager 81 manages location information in association with the terminal ID of the portable terminal 10 that has detected the location information. More specifically, for each terminal ID, the second manager 81 registers the following pieces of information as a pair into the location information DB 72: location information output from the accepting unit 82; and acquisition time contained in the location information (see FIG. 10). Further, the second manager 81 reads, from the location information DB 72, a pair of location information and acquisition time that is associated with the terminal ID of the portable terminal 10 that is making a distribution request for the content information 25, and outputs the read information to the extractor 83.

The accepting unit 82 accepts a distribution request for the content information 25 made from the third controller 48 of the portable terminal 10. The accepting unit 82 outputs a notification signal to the extractor 83 to notify that the accepting unit 82 has accepted the distribution request.

The accepting unit 82 also accepts the content information 25. The content information 25 is uploaded from the portable terminal 10 via the WAN 15. The content information 25 is also uploaded via the WAN 15 from another terminal (not illustrated) different from the portable terminal 10. Examples of such another terminal include a personal computer operated by an individual user in the same manner as the portable terminal 10, and a personal computer operated by an employee of a company offering the content information 25 as a commercial item. The accepting unit 82 outputs the accepted content information 25 to the first manager 80.

The accepting unit 82 also accepts location information. The accepting unit 82 outputs the accepted location information to the second manager 81.

The accepting unit 82 further accepts a print request. The accepting unit 82 outputs, to the first manager 80, the content ID of the content information 25 for which the print request has been made. In this case, the first manager 80 reads, from the content information DB 71, the content information 25 having the content ID output from the accepting unit 82, and outputs the read content information 25 to the controller 84. Further, the accepting unit 82 outputs, to the controller 84, the transmitter ID of the attached transmitter 16A contained in the print request.

The extractor 83 activates when the extractor 83 receives, from the accepting unit 82, a notification signal notifying that a distribution request has been accepted, that is, when a distribution request is received by the accepting unit 82. The extractor 83 requests the first manager 80 to output all the pairs of the content information 25 and the corresponding attribute information that are registered in the content information DB 71. Further, the extractor 83 requests the second manager 81 to output a pair of location information and the corresponding acquisition time that is associated with the terminal ID of the portable terminal 10 making the distribution request. The extractor 83 extracts the content information 25 based on the following pieces of information: information transmitted from the first and second managers 80 and 81 in response to the above-mentioned requests; information stored in the site information DB 73; and information stored in the attribute information DB 74. More specifically, the extractor 83 extracts the content information 25 having attribute information suited for the location information associated with the terminal ID of the portable terminal 10 making the distribution request. The extractor 83 outputs the extracted content information 25 to the controller 84.

The controller 84 executes a control process that distributes the content information 25 extracted by the extractor 83 to the portable terminal 10 making the distribution request. The content information 25 distributed by the controller 84 is received by the third controller 48 of the portable terminal 10.

Further, the controller 84 transmits, to the printer 12, the content information 25 for which a print instruction has been given. At this time, the controller 84 identifies the printer 12 to which to transmit the content information 25, based on the transmitter ID of the attached transmitter 16A from the accepting unit 82 and the printer information 75. The following pieces of information are registered in the printer information 75: the transmitter ID of the attached transmitter 16A; and the printer ID representing identification information of the corresponding printer 12. The controller 84 reads, from the printer information 75, the printer ID of the printer 12 corresponding to the transmitter ID of the attached transmitter 16A output from the accepting unit 82, and transmits the content information 25 to the printer 12 having the read printer ID.

The controller 84 issues an authentication key for printing the content information 25. The controller 84 transmits the authentication key to the printer 12 together with the content information 25. The controller 84 transmits the authentication key also to the portable terminal 10 that is making a print request. Printing of the content information 25 is enabled by the user 14 entering, into the printer 12, the authentication key transmitted to the portable terminal 10.

As illustrated in FIG. 9, in the content information DB 71, the following pieces of information are registered as a pair for each content ID: the content information 25; and the attribute information of the content information 25. The attribute information includes the type of the content information 25, and the subject of the content information 25. Examples of the types of the content information 25 include "photograph", "illustration", "map", and "musical score". Example of the subjects of the content information 25 include "mountain", "railway", "flower", "cartoon character", "piano", and "idol". The types and subjects of content information described above are only illustrative and there may be many other various types and subjects of content information. For instance, examples of such content information 25 to be registered may include the content information 25 with the type "advertisement" and the subject "concert" (i.e., a concert poster), and the content information 25 with the type "book" and the subject "Buddhist statue" (i.e., a photo book of Buddhist statues).

The content information 25 with the content ID C000004 is created by an individual user. Further, the content information 25 is permitted by the individual user to be shared with other users when uploaded to the distribution server 11. Accordingly, information registered as the attribute information includes an indication that the content information is created by an individual user and whose sharing is permitted by the individual user. As described above, examples of the content information 25 include content information created by an individual user and whose sharing is permitted by the individual user.

A content ID is attached to the content information 25 by the first manager 80 at the time of registration of the content information 25. As for attribute information, the attribute information may be entered by the user himself or herself when registering the content information 25, or may be acquired by performing image analysis on the content information 25.

Figure 10:
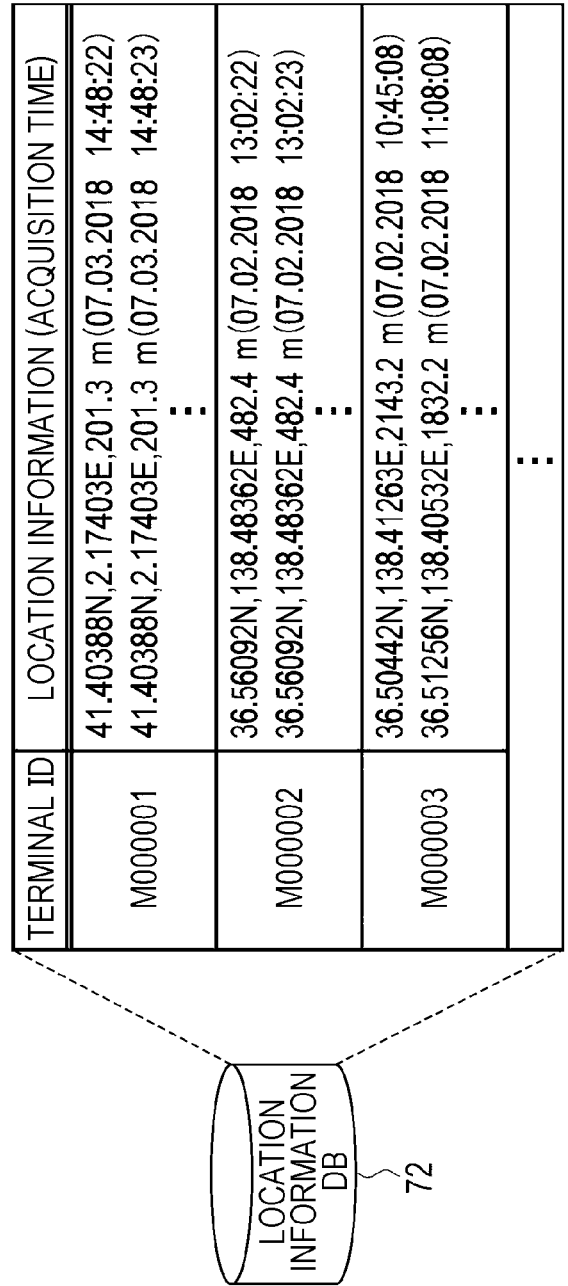
FIG. 10 illustrates the contents of a location information database.

As illustrated in FIG. 10, in the location information DB 72, the following pieces of information are registered as a pair for each terminal ID: location information; and the time of acquisition of the location information.

Figure 11:
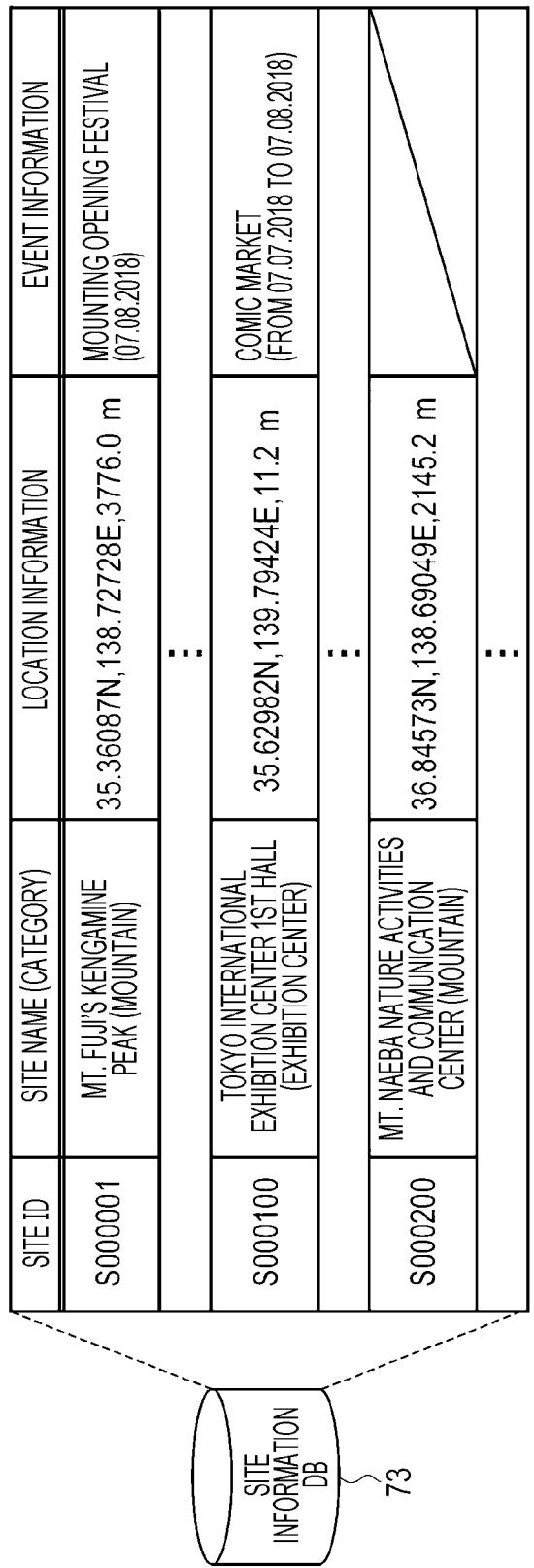
FIG. 11 illustrates the contents of a site information database.

As illustrated in FIG. 11, information about each site is registered in the site information DB 73. The term site as used herein refers to a place having a name and uniquely identified by location information. Examples of sites include sightseeing spots such as the Mt. Fuji's Kengamine peak and buildings such as the Tokyo International Exhibition Center 1st hall. Other examples of sites include, although not illustrated in FIG. 11, stores such as department stores, supermarkets, and convenience stores in a city.

In the site information DB 73, site name, category, location information, and event information are registered for each site ID representing site identification information. Category refers to the type of a site, examples of which include "mountain" and "exhibition center". Event information represents a pair of the following pieces of information: descriptions of an event that takes place on the site; and the date of the event. Examples of events include a mountain opening festival if the site is the Mt. Fuji's Kengamine peak, and a comic market if the site is the Tokyo International Exhibition Center 1st hall. For such site information, for example, information obtained with a mapping application program may be used.

Figure 12:
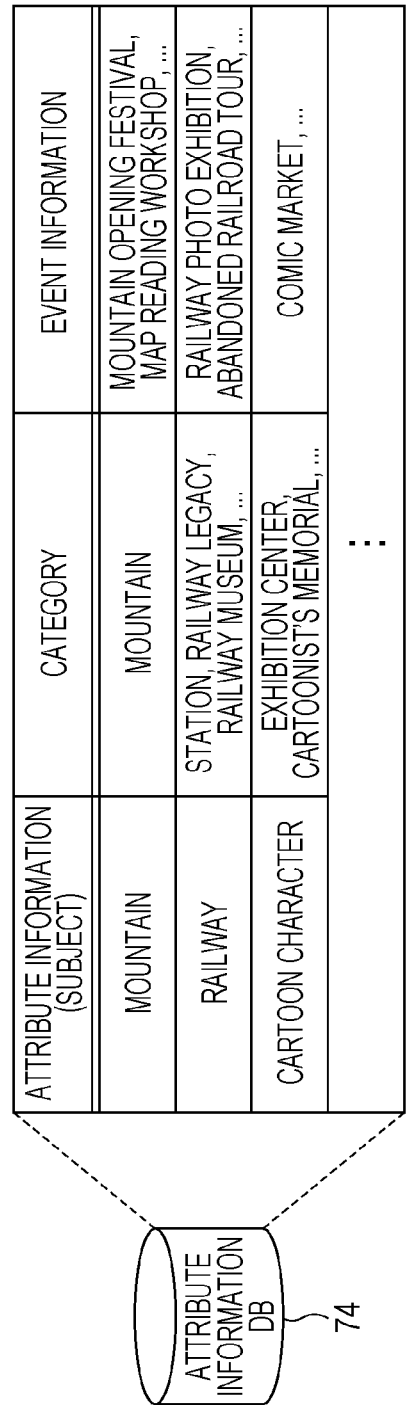
FIG. 12 illustrates the contents of an attribute information database.

As illustrated in FIG. 12, in the attribute information DB 74, the following pieces of information are registered for each subject included in the attribute information of the content information 25: the category of the corresponding site; and event information on the corresponding site. For example, for the attribute information "mountain", "mountain" is registered in Category, and "mountain opening festival", "map reading workshop", and other such pieces of information are registered in Event Information. For example, for the attribute information "railway", "station", "railway legacy", "railway museum", and other such pieces of information are registered in Category, and "railway photo exhibition", "abandoned railroad tour", and other such pieces of information are registered in Event Information. Attribute information corresponding to each site can be identified from the attribute information DB 74.

Figure 13:
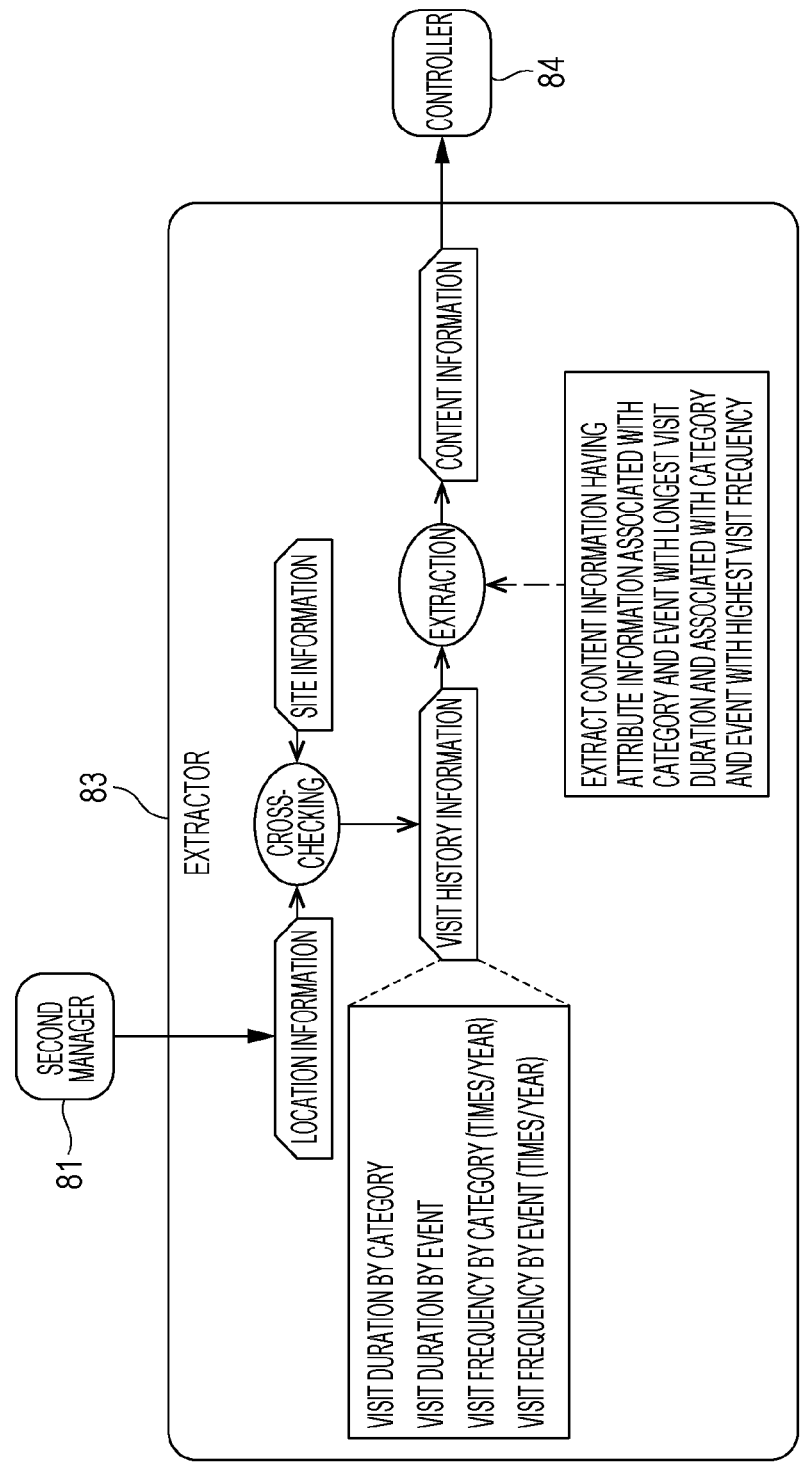
FIG. 13 illustrates how content information is extracted by an extractor by referencing visit history information determined from location information.

As illustrated in FIG. 13, the extractor 83 creates visit history information by checking, against site information in the site information DB 73, location information output from the second manager 81 and associated with the terminal ID of the portable terminal 10 that is making a distribution request. The visit history information refers to information indicating what kind of site the user 14 of the portable terminal 10 making the distribution request has visited in the past.

The visit history information includes visit duration and visit frequency. Visit duration literally means the amount of time that the user 14 visiting a given site has spent on the site. For example, if a site indicated by location information is the Makuhari Messe event hall, and the location information indicative of the Makuhari Messe event hall has been continuously registered from 12 a.m. to 13 p.m., then the duration of visit to the Makuhari Messe event hall by the user 14 is determined to be one hour. Visit frequency is defined as the number of times that the user has visited a given site divided by a preset period of time. Examples of such a preset period of time include one year, half year, or one month. For example, if a site indicated by location information is the Toji temple, and the location information indicative of the Toji temple has been registered six times in a year, then the frequency of visits to the Toji temple by the user 14 is determined to be 6 times/year.

The extractor 83 calculates the following values as visit history information: visit duration by site category; visit duration by event; visit frequency by category (times/year); and visit frequency by event (times/year). Then, based on the attribute information DB 74, the extractor 83 identifies attribute information associated with the category and event with the longest visit duration, and attribute information associated with the category and event with the highest visit frequency. Further, the extractor 83 extracts the content information 25 having the identified attribute information. At this time, the extractor 83 may extract all the pieces of content information 25 having the identified attribute information, or may further narrow down the pieces of content information 25 having the identified attribute information to those pieces of content information 25 matching a narrowing condition. Examples of such narrowing conditions include extracting the 5 latest pieces of content information 25 in the order of registration into the content information DB 71, and extracting only those pieces of content information 25 created by an individual.

The category and event with the longest visit duration, and the category and event with the highest visit frequency can be said to be categories and events that attract particularly strong interest from the user 14. Hence, the content information 25 extracted by the extractor 83 can be said to be content information capable of attracting the interest of the user 14 and for which a print instruction is likely to be given by the user 14 with a relatively high probability.

For example, a case is considered in which the category with the longest visit duration is "mountain". In this case, according to the attribute information DB 74 illustrated in FIG. 12, the attribute information corresponding to the category "mountain" is "mountain". Therefore, in this case, the extractor 83 identifies that the attribute information associated with the category with the longest visit duration is "mountain". Then, the extractor 83 extracts the content information 25 having the identified attribute information "mountain", that is, for example, the content information 25 with the content ID C000001 and the content information 25 with the content ID C000005 that are illustrated in FIG. 9.

Further, a case is considered in which the event with the highest visit frequency is "comic market". In this case, according to the attribute information DB 74, the attribute information corresponding to the event information "comic market" is "cartoon character". Therefore, in this case, the extractor 83 identifies that the attribute information associated with the event with the highest visit frequency is "cartoon character". Then, the extractor 83 extracts the content information 25 having the identified attribute information "cartoon character", that is, for example, the content information 25 with the content ID C000004 illustrated in FIG. 9.

Further, if the category with the highest visit frequency is "art museum", the extractor 83 extracts the content information 25 having the attribute information "art", for example, the content information 25 such as an advertisement describing the schedule of a special exhibition or a photo book of paintings.

As described above, the extractor 83 extracts the content information 25 by referencing visit history information including visit duration and visit frequency and determined from location information. Examples of attribute information identified by the extractor 83 are not limited to attribute information associated with the category and event with the longest visit duration, and attribute information associated with the category and event with the highest visit frequency. Examples of such attribute information to be identified may include, in addition to the above-mentioned pieces of attribute information, attribute information associated with the categories and events with the second and third longest visit durations, and attribute information associated with the categories and events with the second and third highest visit frequencies. Visit history information may include at least one of visit duration and visit frequency.

Figure 14:
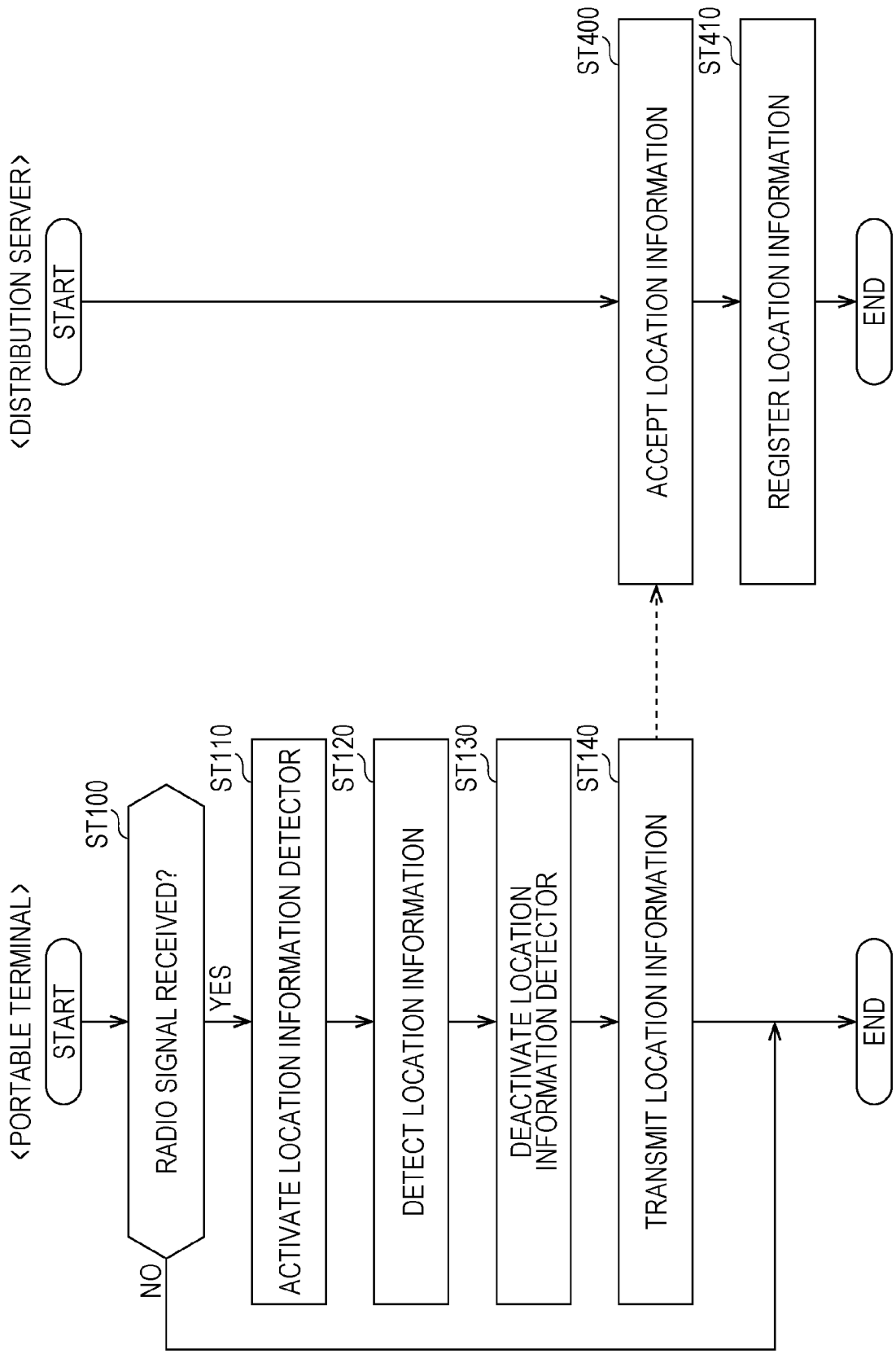
FIG. 14 is a flowchart illustrating a procedure performed by each of a portable terminal and a content information distribution server.

Referring now to the flowcharts in FIGS. 14 and 15, operation according to the above-mentioned configuration will be described above. First, as illustrated in FIG. 14, when a radio signal is received from the transmitter 16 by the receiver 45 of the portable terminal 10 (step ST100: YES), the location information detector 20 is activated from an inactive state as illustrated in FIG. 6 (step ST110). As a result, location information is detected by the location information detector 20 (step ST120). After the location information is detected, the location information detector 20 is deactivated again by the first controller 46 (step ST130).

The location information is output from the location information detector 20 to the second controller 47. Then, the location information is transmitted by the second controller 47 to the distribution server 11 (step ST140).

In the distribution server 11, the location information is accepted by the accepting unit 82 (step ST400). The location information is output from the accepting unit 82 to the second manager 81, and registered into the location information DB 72 by the second manager 81 (step ST410).

As described above, in response to receiving of a radio signal from the transmitter 16, the location information detector 20 is temporarily activated by the first controller 46 to detect location information. Then, the location information is transmitted to the distribution server 11 by the second controller 47. This configuration may reduce power consumption as compared with keeping the location information detector 20 active at all times. Since the location information detector 20 uses either GPS or Wi-Fi, keeping the location information detector 20 active at all times leads to increased power consumption. The above-mentioned configuration may minimize such an increase in power consumption.

Further, location information is detected in response to not only a radio signal from the registered transmitter 16B but also radio signals from all the transmitters 16 except the attached transmitter 16A. This configuration may allow detect location information to be detected by means of short-range wireless communication without range constraints. This configuration obviates the need for the operating company of the distribution server 11 to increase the number of registered transmitters 16B to be installed to extend the detection range for location information. This may reduce the trouble of installing a large number of registered transmitters 16B, and also reduce cost.

Figure 15:
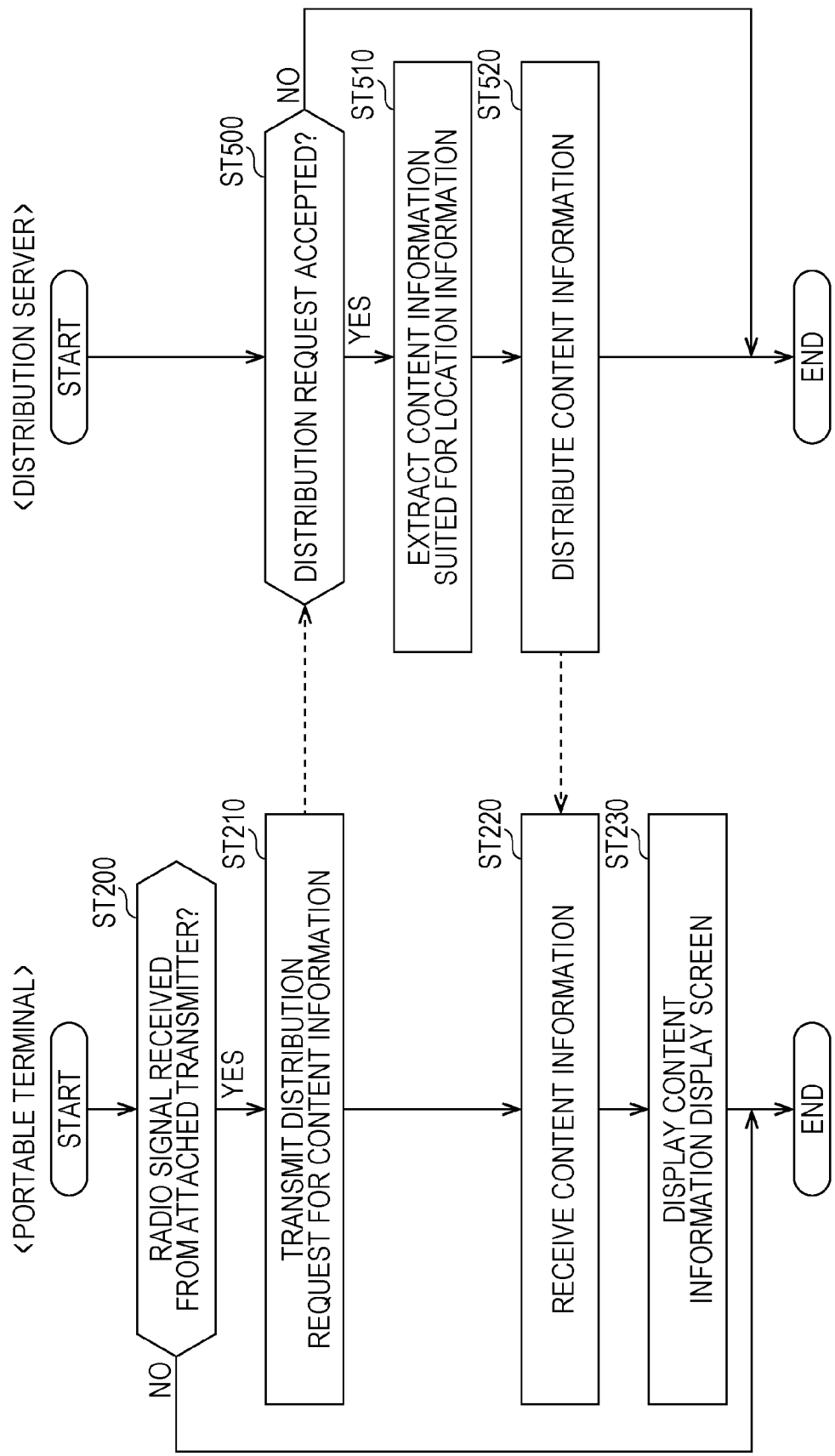
FIG. 15 is a flowchart illustrating a procedure performed by each of a portable terminal and a content information distribution server.

As illustrated in FIG. 15, when a radio signal is received from the attached transmitter 16A by the receiver 45 of the portable terminal 10 (step ST200: YES), a distribution request for the content information 25 is transmitted to the distribution server 11 by the third controller 48 (step ST210).

In the distribution server 11, the distribution request is accepted by the accepting unit 82 (step ST500: YES). Then, as illustrated in FIG. 13, the extractor 83 extracts, while referencing visit history information including visit duration and visit frequency, the content information 25 suited for the location information associated with the terminal ID of the portable terminal 10 making the distribution request (step ST510). The extracted content information 25 is output from the extractor 83 to the controller 84. Then, the content information 25 is output by the controller 84 to the portable terminal 10 making the distribution request (step ST520).

As described above, the extractor 83 extracts the content information 25 having attribute information suited for the location information associated with the terminal ID of the portable terminal 10 that is making a distribution request. Then, the extracted content information 25 is distributed by the controller 84 to the portable terminal 10 making the distribution request. Consequently, the content information 25 that is highly interesting to the user 14 and for which a print request is likely to be made by the user 14 with a relatively high probability may be extracted for distribution.

Since the content information 25 is extracted by the extractor 83 by referencing visit history information including visit duration and visit frequency, the content information 25 attracting greater interest from the user 14 may be extracted.

Examples of the content information 25 include content information created by an individual user and whose sharing is permitted by the individual user. This may increase the variety of the content information 25 to be provided.

In the portable terminal 10, the content information 25 from the distribution server 11 is received by the third controller 48 (step ST220). The received content information 25 is output from the third controller 48 to the fourth controller 49. Then, the content information display screen 60 illustrated in FIG. 7 is displayed on the display 34A by the fourth controller 49 (step ST230).

Then, a print instruction is given on the content information display screen 60. A print request is thus transmitted from the accepting unit 50 of the portable terminal 10 to the distribution server 11.

When the distribution server 11 receives the print request, the content information 25 for which the print instruction has been given is read from the content information DB 71 by the first manager 80. The content information 25 is output from the first manager 80 to the controller 84, and transmitted by the controller 84 to the printer 12 with an authentication key attached to the content information 25.

Further, the authentication key is transmitted by the controller 84 to the portable terminal 10 making the print request. The user 14 enters the authentication key into the printer 12, has the content information 25 printed by the printer 12, and pays a printing fee at the register.

As described above, in response to receiving of a radio signal from the attached transmitter 16A, the third controller 48 causes the distribution server 11 to distribute the content information 25 suited for location information. Then, the content information 25 distributed from the distribution server 11 is displayed on the display 34A by the fourth controller 49. This configuration saves the user 14 the trouble of looking for the content information 25 in which the user 14 has interest. Further, a print instruction given for the content information 25 on the content information display screen 60 is accepted by the accepting unit 50. This may allow the user 14 to easily provide a print instruction for the content information 25 in which the user 14 has interest. Further, the content information 25 may be delivered to the user 14 in a short time.

As for the content information 25 distributed from the distribution server 11, the content information 25 may be simply displayed on the display, and a print instruction may not be accepted for the content information 25.

In an alternative configuration, to adapt to the need of the user 14 who does not have to receive distribution of the content information 25, the user 14 may be allowed to choose, in response to receiving of a radio signal from the attached transmitter 16A, whether to transmit a distribution request for the content information 25 to the distribution server 11.

In an alternative configuration, the location information detector 20 may be temporarily activated to detect location information also in response to receiving of a radio signal from the attached transmitter 16A.

Second Exemplary Embodiment

Figure 16:
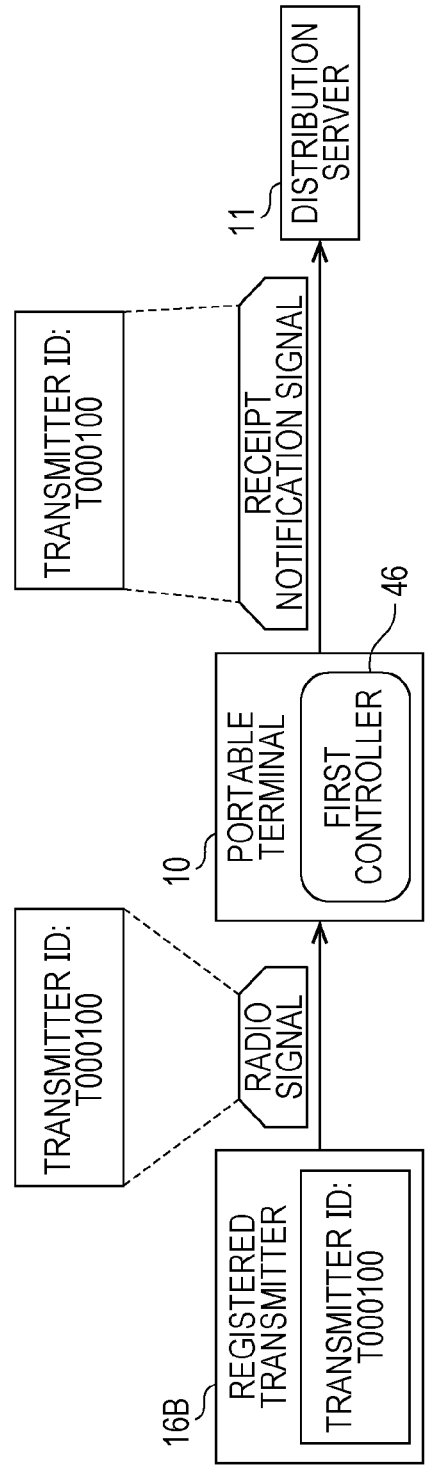
FIG. 16 illustrates how, in response to receiving of a radio signal from a registered transmitter, a receipt notification signal is transmitted from a portable terminal to a content information distribution server.
Figure 17:
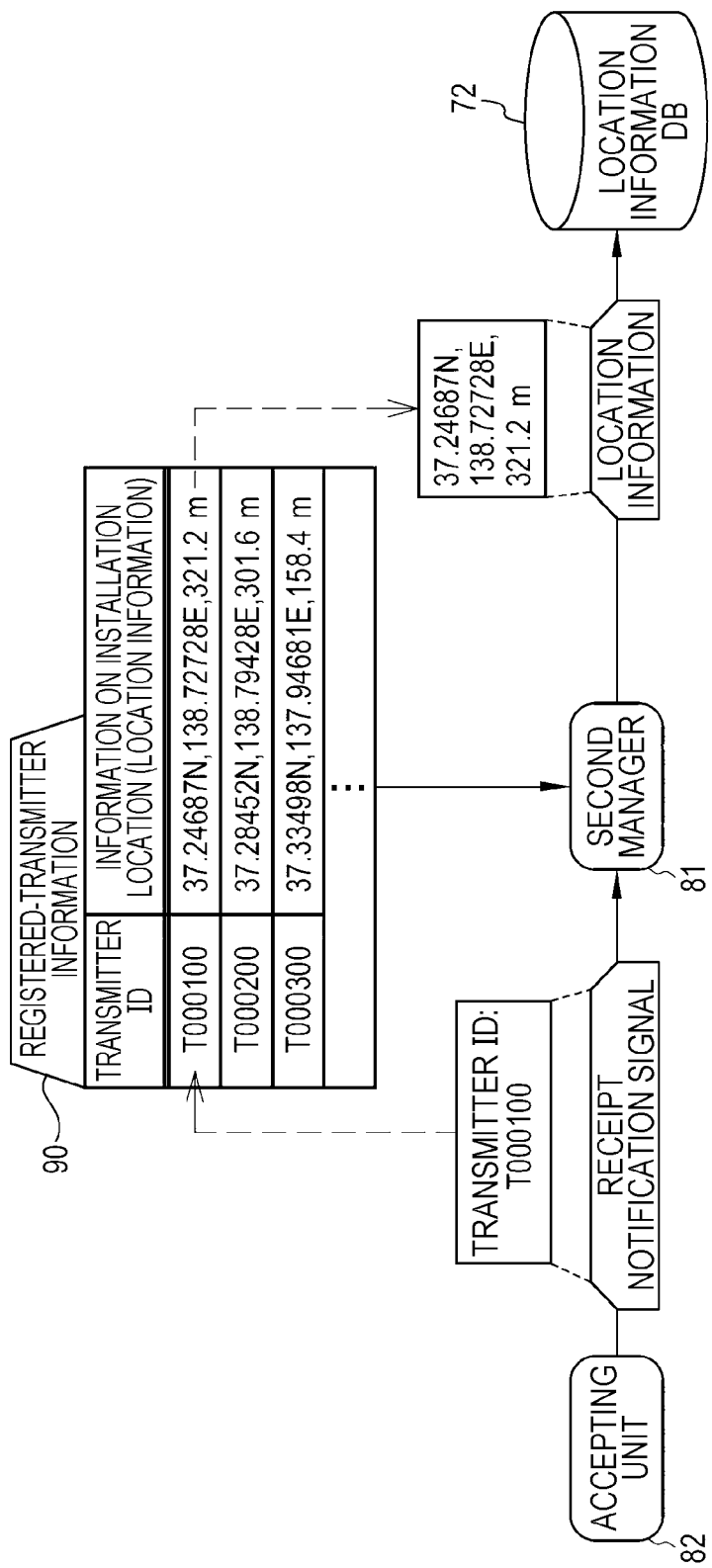
FIG. 17 illustrates how information on the installation location of a registered transmitter is registered as location information.

According to a second exemplary embodiment illustrated in FIGS. 16 and 17, in response to receiving of a radio signal from the registered transmitter 16B, a receipt notification signal is transmitted to the distribution server 11 to notify that a radio signal has been received from the registered transmitter 16B.

In the first exemplary embodiment described above, the location information detector 20 is temporarily activated by the first controller 46 to detect location information even when a radio signal is received from the registered transmitter 16B. In this regard, as described above, the installation location of the registered transmitter 16B is pre-registered in the distribution server 11. Accordingly, in the case of the registered transmitter 16B, location information is detected as follows without having to make the location information detector 20 detect the location information.

As illustrated in FIG. 16, when a radio signal is received from the registered transmitter 16B, the first controller 46 of the portable terminal 10 does not cause the location information detector 20 to detect location information. Alternatively, the first controller 46 transmits a receipt notification signal to the distribution server 11 to notify that a radio signal has been received from the registered transmitter 16B. The receipt notification signal contains the transmitter ID of the registered transmitter 16B.

As illustrated in FIG. 17, in the distribution server 11, the receipt notification signal is accepted by the accepting unit 82. The accepting unit 82 outputs the receipt notification signal to the second manager 81.

As registered-transmitter information 90, information on the installation location of the registered transmitter 16B is registered for each transmitter ID of the registered transmitter 16B. The registered-transmitter information 90 is stored in the storage device 30B. The second manager 81 reads, from the registered-transmitter information 90, installation location information corresponding to the transmitter ID of the registered transmitter 16B contained in the receipt notification signal output from the accepting unit 82. The second manager 81 registers the read installation location information into the location information DB 72 as location information. In this case, the time of transmission of the receipt notification signal from the portable terminal 10 is registered as acquisition time.

As described above, according to the second exemplary embodiment, when a radio signal is received from the registered transmitter 16B, a receipt notification signal is transmitted to the distribution server 11 to notify that a radio signal has been received from the registered transmitter 16B, instead of the first controller 46 causing the location information detector 20 to detect location information. This configuration may further reduce the number of occasions in which the location information detector 20 is activated, thus further reducing power consumption.

Third Exemplary Embodiment

Figure 18:
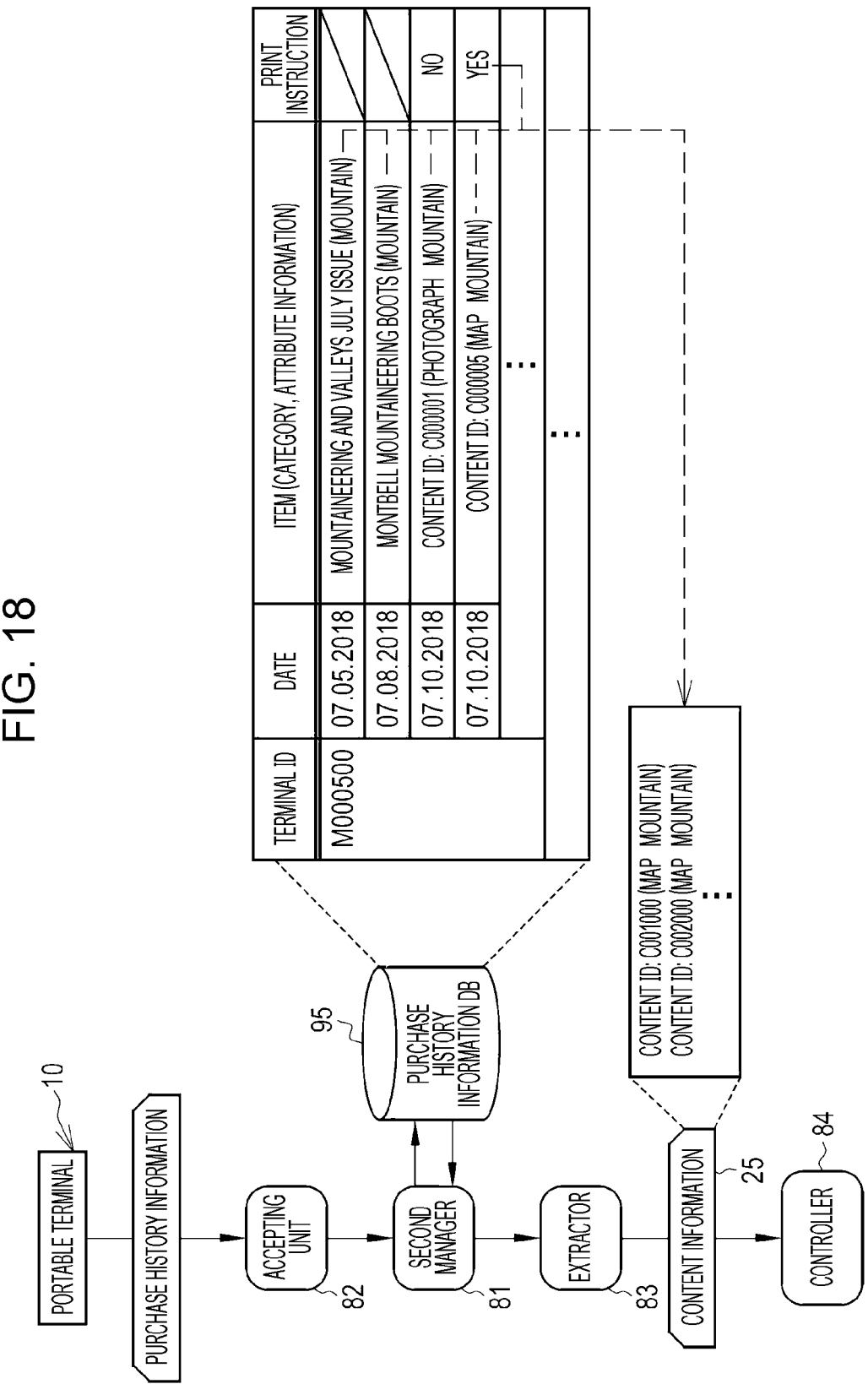
FIG. 18 illustrates how content information is extracted by also referencing purchase history information.

In a third exemplary embodiment illustrated in FIG. 18, the content information 25 is extracted by referencing, in addition to location information, purchase history information representing a history of item purchases on the portable terminal 10.

As illustrated in FIG. 18, the accepting unit 82 accepts purchase history information from the portable terminal 10. The purchase history information represents a pairwise listing of each item purchased by the user 14 on the portable terminal 10 and the date of purchase of the item, and includes the terminal ID of the portable terminal 10. The accepting unit 82 outputs the purchase history information to the second manager 81. The second manager 81 registers the purchase history information output from the accepting unit 82 into a purchase history information DB 95. The purchase history information DB 95 is a database of purchase history information registered for each terminal ID. As with the location information DB 72 or other databases, the purchase history information DB 95 is stored in the storage device 30B.

Examples of items include items purchased by the user 14 on Internet shopping sites, and the content information 25 distributed from the distribution server 11. Examples of items purchased by the user 14 on Internet shopping sites include Mountaineering and Valleys July issue, and Montbell mountaineering boots. As with a location site, a category is registered in advance for each item purchased by the user 14 on an Internet shopping site. For the content information 25 distributed from the distribution server 11, information indicating whether the user 14 has given an instruction to print the content information 25 is also registered. That is, the purchase history information includes information indicating whether an instruction to print the distributed content information 25 has been given on the portable terminal 10.

In this case, the extractor 83 references purchase history information in addition to location information in extracting content information. For example, the extractor 83 counts, for each item category, the number of times an item has been purchased. Then, the extractor 83 extracts the content information 25 having attribute information associated with each category that is ranked within top 3 for the longest visit duration (or may be ranked within top 3 for the highest visit frequency) and also ranked within top 3 for the highest purchase count. At this time, the extractor 83 does not extract the content information 25 having attribute information identical to the attribute information of the content information 25 for which a print instruction has not been given, but extracts the content information 25 having attribute information identical to the attribute information of the content information 25 for which a print instruction has been given.

FIG. 18 illustrates a case in which the category "mountain" is ranked within top 3 in terms of item purchase count, a print instruction has not been given for the content information 25 with the attribute information "photograph" (content ID: C000001), and a print instruction has been given for the content information 25 with the attribute information "map" (content ID: C000005). In this case, the extractor 83 extracts the content information 25 with the attribute information "mountain" and "map" (content IDs: C001000, C002000, etc.).

As described above, in the third exemplary embodiment, the extractor 83 also references purchase history information in addition to location information in extracting the content information 25. This may allow the extractor 83 to extract the content information 25 that attracts greater interest of the user 14.

Further, the purchase history information contains information indicating whether a print instruction has been given for the content information 25. Consequently, the content information 25 better suited for the typical purchase behavior of the user 14 may be extracted, such as by, as described above, extracting the content information 25 having attribute information identical to the attribute information of the content information 25 for which a print instruction has been given.

In an alternative configuration, the extractor 83 may normally extract the content information 25 having attribute information identical to the attribute information of the content information 25 for which a print instruction has been given, and the extractor 83 may, at appropriate timing, extract the content information 25 having attribute information different from the attribute information of the content information 25 for which a print instruction has been given. This may increase the variety of the content information 25 to be presented in comparison to extracting and displaying the content information 25 with the same attribute information every time, thus directing the attention of the user 14 to different content information.

The content information 25 may be extracted by using a more complex and statistical approach. For example, for a group of users 14 for whom the category of the site with the longest visit duration (or the highest visit frequency) is the same among these users 14, purchase history information is used to analyze for which content information 25 with what kind of attribute information a print instruction has been given by each such user 14. Then, the content information 25 having attribute information with a high frequency of receiving a print instruction is preferentially extracted.

Fourth Exemplary Embodiment

In a fourth exemplary embodiment illustrated in FIG. 19, the content information 25 is extracted by referencing, in addition to location information, viewing history information representing a history of web page views on the portable terminal 10.

As illustrated in FIG. 19, the accepting unit 82 accepts viewing history information from the portable terminal 10. The viewing history information represents a pairwise listing of each web page viewed by the user 14 on the portable terminal 10 and the date of viewing of the web page, and includes the terminal ID of the portable terminal 10. For each web page, as with a location site and an item, a category is registered in advance for the web page. The accepting unit 82 outputs the viewing history information to the second manager 81. The second manager 81 registers the viewing history information output from the accepting unit 82 into a viewing history information DB 100. The viewing history information DB 100 is a database of viewing history information registered for each terminal ID. As with the location information DB 72 or other databases, the viewing history information DB 100 is stored in the storage device 30B.

In this case, the extractor 83 references the viewing history information in addition to location information in extracting content information. For example, the extractor 83 counts, for each web page category, the number of times a web page has been viewed. Then, the extractor 83 extracts the content information 25 having attribute information associated with each category that is ranked within top 3 for the longest visit duration (or may be ranked within top 3 for the highest visit frequency) and also ranked within top 3 for the highest viewing count.

FIG. 19 illustrates a case in which web pages with the category "Buddhist statue" are ranked within top 3 in terms of viewing count. In this case, the extractor 83 extracts the content information 25 with the attribute information "Buddhist statue" (content IDs: C005000, C006000, etc.).

As described above, in the fourth exemplary embodiment, the extractor 83 also references viewing history information in addition to location information in extracting the content information 25. Consequently, as with the third exemplary embodiment, the content information 25 that attracts greater interest of the user 14 may be extracted.

Various modifications may be made to the hardware configuration of the computer constituting the distribution server 11. For example, for the purpose of enhancing throughout and reliability, the distribution server 11 may be made up of multiple server computers separated into discrete pieces of hardware. Specifically, the functions of the first manager 80, the second manager 81, and the accepting unit 82, and the functions of the extractor 83 and the controller 84 may be provided in a distributed fashion by two server computers. In this case, the two server computers constitute the distribution server 11.

As described above, various modifications may be made to the computer hardware configuration in accordance with required performance characteristics, such as throughput, safety, and reliability. Further, for the purpose of ensuring safety and reliability, not only hardware but also application programs such as the content information distribution program 70 may of course be duplexed for redundancy, or stored in a distributed fashion across multiple storage devices.

As for the hardware structure of a processing unit that executes each of various processes described above with reference to the above-mentioned exemplary embodiments, such as processes corresponding to the receiver 45, the first controller 46, the second controller 47, the third controller 48, the fourth controller 49, the accepting unit 50, the first manager 80, the second manager 81, the accepting unit 82, the extractor 83, and the controller 84, various processors mentioned below may be employed. Examples of such various processors include, in addition to CPUs serving as general-purpose processors that execute software (such as the location-information-utilizing program 40 and the content information distribution program 70) to function as various processing units, programmable logic devices (PLDs), which are processors whose circuit configuration can be reprogrammed after manufacturing, such as field programmable gate arrays (FPGAs), and dedicated electrical circuits, which are processors having a circuit configuration designed specifically for execution of a specific process, such as application specific integrated circuits (ASICs).

A single processing unit may be implemented by one of the various processors mentioned above, or may be implemented by a combination of two or more processors of the same type or different types (e.g., a combination of multiple FPGAs or a combination of a CPU and a FPGA). Multiple processing units may be implemented by a single processor.

Examples of cases in which multiple processing units are implemented by a single processor include first and second examples described below. In the first example, as typically represented by computers such as client and server computers, a single processor is implemented as a combination of one or more CPUs and software, and the processor functions as multiple processing units. In the second example, as typically represented by a System-on-Chip (SoC) or other circuits, the functions of the entire system including multiple processing units are implemented on a single integrated circuit (IC) chip. As described above, various processing units may be each implemented as a hardware structure by using one or more of the various processors mentioned above.

Further, as more specific examples of the hardware structure of these various processors, electric circuitry combining circuit elements such as semiconductor devices may be used.

From the foregoing description, exemplary embodiments of the present disclosure as set forth in Additional Items 1 and 2 below may be conceived.

Additional Item 1

A location-information-utilizing apparatus including:

a first control processor that executes a control process, the control process including, in response to receiving of a radio signal used for short-range wireless communication from a transmitter, temporarily activating a location information detector that detects location information, and causing the location information detector to detect the location information; and a second control processor that executes a control process, the control process including transmitting the location information detected by the location information detector to a server that provides a service utilizing the location information.

The portable terminal 10 according to each of the above-mentioned exemplary embodiments corresponds to an example of the location-information-utilizing apparatus.

Additional Item 2

A content information distribution server including:

a first management processor that manages content information in association with attribute information of the content information;

a second management processor that manages location information of a portable terminal in association with identification information of the portable terminal, the portable terminal being a portable terminal that receives distribution of the content information, the location information being detected by a location information detector by temporarily activating the location information detector in response to the portable terminal receiving a radio signal used for short-range wireless communication from a transmitter;

an accepting processor that accepts, from the portable terminal, a distribution request for the content information;

an extraction processor that, in response to accepting of the distribution request by the accepting processor, extracts the content information having the attribute information suited for the location information associated with identification information of the portable terminal that is making the distribution request; and a control processor that executes a control process, the control process including distributing the content information extracted by the extraction processor to the portable terminal that is making the distribution request.

The techniques according to exemplary embodiments of the present disclosure may include suitable combinations of the various exemplary embodiments mentioned above and their various modifications. For example, the third exemplary embodiment and the fourth exemplary embodiment may be combined such that the content information 25 is extracted by referencing location information, purchase history information, and viewing history information. It is needless to mention that the above-mentioned exemplary embodiments are not intended to be limiting but may be implemented in various ways without departing from the scope and spirit of the present disclosure.

Further, the scope of the present disclosure encompasses, in addition to a program, a storage medium storing a program. Specifically, application programs such as the location-information-utilizing program 40 and the content information distribution program 70 may not necessarily be stored in the storage devices 30A and 30B as in the above-mentioned exemplary embodiments. The location-information-utilizing program 40 and the content information distribution program 70 may be provided by being stored in a computer readable storage medium. Examples of such storage media include optical discs such as a compact disc read only memory (CD-ROM) and a digital versatile disc read only memory (DVD-ROM), and semiconductor memories such as a universal serial bus (USB) memory and a memory card. The location-information-utilizing program 40 and the content information distribution program 70 may be acquired from an external apparatus via a communication line such as the WAN 15 connected to the communication unit 33.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A non-transitory computer readable medium storing a program causing a computer to execute a process utilizing location information, the process comprising:

a first control process that includes, in response to receiving of a radio signal used for short-range wireless communication from a transmitter, temporarily activating a location information detector that detects location information, and causing the location information detector to detect the location information; and a second control process that includes transmitting the location information detected by the location information detector to a server that provides a service utilizing the location information.

2. The non-transitory computer readable medium according to claim 1, wherein if the transmitter from which the radio signal is received is a registered transmitter of which identification information and installation location information are pre-registered in the server, the first control process includes, instead of causing the location information detector to detect the location information, transmitting a receipt notification signal to the server, the receipt notification signal including the identification information and notifying that the radio signal has been received from the registered transmitter.

3. The non-transitory computer readable medium according to claim 1, wherein the process further comprises a third control process that includes, if the transmitter from which the radio signal is received is an attached transmitter attached to a printer installed in a store, distributing content information suited for the location information to the server, and a fourth control process that includes displaying, on a display, the content information distributed from the server.

4. The non-transitory computer readable medium according to claim 3, wherein the process further comprises accepting an instruction, the instruction instructing that the content information displayed on the display unit be printed by the printer.

5. The non-transitory computer readable medium according to claim 1, wherein the location information detector detects the location information by use of a global positioning system or Wi-Fi.

6. The non-transitory computer readable medium according to claim 1, wherein the first control process further includes deactivating the positioning sensor after the location information is detected.

7. A non-transitory computer readable medium storing a program causing a computer to execute a process for distributing content information, the process comprising:

managing content information in association with attribution information of the content information;

managing location information of a portable terminal in association with identification information of the portable terminal, the portable terminal being a portable terminal that receives distribution of the content information, the location information being detected by a location information detector by temporarily activating the location information detector in response to the portable terminal receiving a radio signal used for short-range wireless communication from a transmitter;

accepting, from the portable terminal, a distribution request for the content information;

in response to the accepting of the distribution request, extracting the content information having the attribute information suited for the location information associated with identification information of the portable terminal that is making the distribution request; and distributing the extracted content information to the portable terminal that is making the distribution request.

8. The non-transitory computer readable medium according to claim 7, wherein the extracting includes extracting the content information by referencing visit history information determined from the location information.

9. The non-transitory computer readable medium according to claim 8, wherein the visit history information includes at least one of visit duration and visit frequency.

10. The non-transitory computer readable medium according to claim 7, wherein the accepting includes accepting purchase history information, the purchase history information representing a history of item purchases on the portable terminal, and wherein the extracting includes extracting the content information by referencing the purchase history information in addition to the location information.

11. The non-transitory computer readable medium according to claim 10, wherein the purchase history information includes information indicating whether an instruction has been given on the portable terminal, the instruction instructing that the content information distributed to the portable terminal be printed by a printer installed in a store.

12. The non-transitory computer readable medium according to claim 7, wherein the accepting includes accepting viewing history information, the viewing history information representing a history of web page views on the portable terminal, and wherein the extracting includes extracting the content information by referencing the viewing history information in addition to the location information.

13. The non-transitory computer readable medium according to claim 7, wherein the content information includes content information created by an individual user and whose sharing is permitted by the individual user.

14. A content information distribution server comprising:

a processor, configured to:

manage content information in association with attribution information of the content information;

manage location information of a portable terminal in association with identification information of the portable terminal, the portable terminal being a portable terminal that receives distribution of the content information, the location information being detected by a location information detector by temporarily activating the location information detector in response to the portable terminal receiving a radio signal used for short-range wireless communication from a transmitter;

accept, from the portable terminal, a distribution request for the content information;

in response to the accepted distribution request, extract the content information having the attribute information suited for the location information associated with identification information of the portable terminal that is making the distribution request; and execute a control process, the control process including distributing the extracted content information to the portable terminal that is making the distribution request.

* * * * *